Sept. 20, 1966  J. L. LAUER  3,274,087
PROCESS FOR THE PREPARATION OF ETHANE BY FLASH PHOTOLYSIS
Filed Dec. 3, 1962
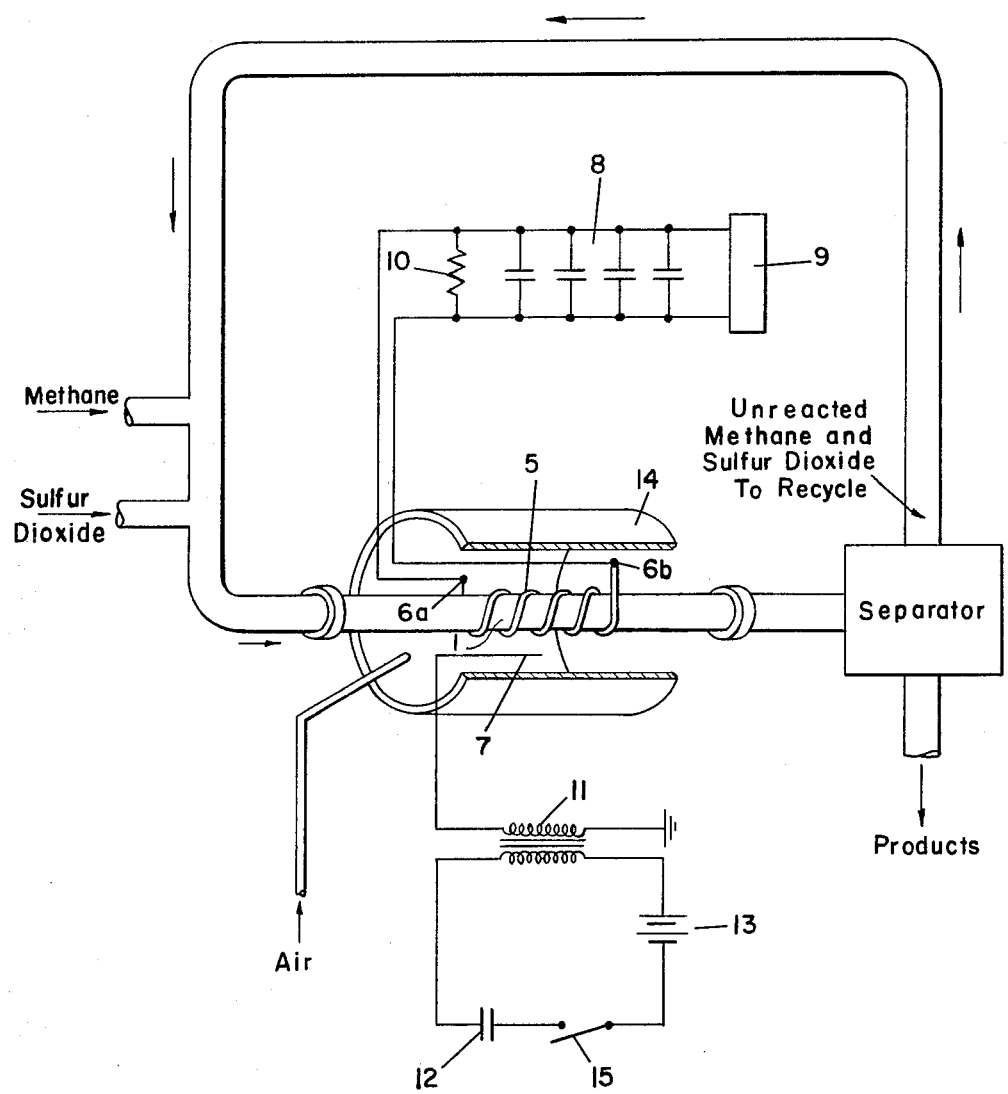
INVENTOR.
JAMES L. LAUER
BY George L. Church
ATTORNEY

United States Patent Office 3,274,087
Patented Sept. 20, 1966

3,274,087
PROCESS FOR THE PREPARATION OF ETHANE BY FLASH PHOTOLYSIS
James L. Lauer, Penn Wynne, Pa., assignor to Sun Oil Company, Philadelphia, Pa., a corporation of Pennsylvania
Filed Dec. 3, 1962, Ser. No. 241,620
2 Claims. (Cl. 204—162)

This invention relates to a method for preparing gaseous hydrocarbons and more particularly to a method for preparing ethane as the principal product by a flash photolysis of methane.

Many different types of photochemical reactions involving hydrocarbons are well known and disclosed in the prior art. The best known reaction involving photocatalysis is that of dissociation or cracking of higher molecular weight materials to form lower molecular weight materials. It has also been disclosed that hydrocarbons may be halogenated photochemically by exposing a mixture of a hydrocarbon, such as methane, and chlorine to the action of ultraviolet light. Alkane sulfonic acids have also been prepared by irradiating a mixture of a paraffin hydrocarbon and sulfur dioxide in the presence of oxygen.

It has now been found that when a mixture of methane and sulfur dioxide are irradiated with ultraviolet light, there is produced no methane sulfonic or sulfinic acids. Unexpectedly, the principal product was found to be ethane.

Accordingly, it is an object of this invention to provide a novel method for preparing ethane from methane.

It is another object of this invention to provide a novel method for preparing ethane as the principal product by flash photolysis of a mixture of methane and sulfur dioxide.

Other objects will become apparent from the following description.

The objects of this invention are accomplished by subjecting a mixture of methane and sulfur dioxide to intense flash irradiation with ultraviolet light. Only a few milliseconds elapse in exposing the mixture to photochemical energy and hence very few side reactions take place. At least 2400 joules of energy are required per flash at a pressure of about 200 mm. of mercury to obtain the desired reaction. While a greater amount of energy can be applied per flash, conversions are not proportionately increased with the application of additional photochemical energy. As a result, equipment which provides an energy output of 2400 to 3600 joules is suitable for this process when operating at a pressure of about 200 mm. of mercury.

If the partial pressure of the mixture of methane and sulfur dioxide is less than about 200 mm. of mercury, lesser amounts of energy are necessary to cause the reaction. Similarly, if the partial pressure of the reactants is greater than about 200 mm. of mercury, amounts of energy in excess of 2400 joules are required. For example, when operating at about 10 mm. of mercury pressure, only about 100 joules of energy are required, whereas if the operating pressure is about 1000 mm. of mercury, about 50,000 joules of energy are required.

It has been found that if the reactants are subjected to continuous radiation, substantially none of the desired products is produced and thus it is preferred in this invention that the mixture of methane and sulfur dioxide be exposed to multiple flashes of ultraviolet radiation to obtain the maximum production of ethane. Thus it is preferred that the number of flashes range between 2 and 10, most preferably from 3 to 7. If the instant process is used in a stationary reaction tube as contrasted to a continuous reaction system, the maximum conversion occurs when exposing the mixture to 3 flashes. In a continuous system maximum conversion occurs when the reactants are exposed to more than 3 flashes depending on the concentration of reactants, rate of flow of the reactants, etc.

In order that each flash emits the required amount of photochemical energy, they should last for at least 2 milliseconds and may last for as long as 4 milliseconds.

This invention will be further understood with reference to the attached drawing which illustrates one mode of carrying out the process.

A quartz tube reaction zone 1 was filled with a 50—50 mixture by volume of methane and $SO_2$ to a total partial pressure of 201.1 mm. of mercury. Reference numeral 5 denotes a xenon-filled helical photoflash lamp surrounding the quartz tube reactor. The flash lamp has tungsten electrodes 6a and 6b and a trigger electrode 7. Four condenser banks in parallel at 8, supply the discharge current. Each condenser bank contains four parallel connected condensers of 25 microfarads each so that the total capacity is 400 microfarads. At least 300 microfarads are necessary and 300 to 500 microfarads is a suitable range. Power supply 9 supplies sufficient direct current voltage to obtain a maximum condenser voltage of 4000 volts and charges at rates up to 10 milliamperes. Shunt resistor 10 provides for bleeding off residual condenser charge after the lamp has been fired. The trigger circuit consists of the coil 11, capable of generating up to 10,000 volts in the secondary when the battery 13 is charged. 0.3 microfarad condenser 12 is discharged through the switch 15 in the primary. The lamp is enclosed by an aluminum reflector 14 and dry air is blown through the space between the reaction zone and the helix to keep the latter cool. With cooling it is possible to flash at two minute intervals. In calibrating, uranyl oxalate actinometery was used to measure the light output of each lamp flash and flash duration was measured with an oscilloscope.

The reaction mixture was subjected to 5 flashes of 2400 joules, each with 3 milliseconds per flash. After flashing, the reaction mixture was removed from the quartz reactor and analyzed by infra red. In addition to unreacted methane and sulfur dioxide, there was found ethane as the principal product with minor amounts of carbon bisulfide and acetylene. It is believed that the acetylene was formed by a photochemical decomposition of the produced ethane.

If the volume ratios of methane and sulfur dioxide are varied within the range of from about 5:95 and 95:5 and substituted for the 50—50 volume percent mixture used in the preceding example, substantially similar results are obtained.

I claim:
1. Method for preparing ethane which comprises subjecting a mixture of methane and sulfur dioxide at a total partial pressure of from 10 mm. to 1000 mm. of mercury to multiple flashes of ultraviolet radiation sufficient to provide from 100 to 50,000 joules of energy.
2. Method in accordance with claim 1 wherein the number of flashes is at least 3 each of which lasts for at least 2 milliseconds.

No references cited.

JOHN H. MACK, *Primary Examiner.*

H. S. WILLIAMS, *Assistant Examiner.*